United States Patent [19]
Bradley

[11] Patent Number: 5,291,230
[45] Date of Patent: Mar. 1, 1994

[54] OPHTHALMIC DEVICE INCLUDES A DETACHABLE NOSEPIECE

[76] Inventor: James B. Bradley, 4805 Inverness Dr., Tyler, Tex. 75703

[21] Appl. No.: 977,717

[22] Filed: Nov. 17, 1992

[51] Int. Cl.$^5$ ............................................. G02C 1/00
[52] U.S. Cl. ................................. 351/88; 351/128; 351/137
[58] Field of Search ............... 351/65, 69, 70, 76, 351/78, 79, 137, 128, 88, 131, 132; 2/445, 446

[56] References Cited

U.S. PATENT DOCUMENTS

| | | | |
|---|---|---|---|
| 742,458 | 10/1901 | Levoy | 351/70 |
| 895,931 | 12/1905 | Adt | 351/65 |
| 1,867,865 | 7/1932 | Nelson . | |
| 2,231,413 | 2/1941 | McDonell et al. | 88/48 |
| 2,660,924 | 2/1950 | Stegeman | 351/88 |
| 4,032,223 | 6/1977 | Bradley, Jr. | 351/132 |
| 4,045,137 | 8/1977 | Bradley, Jr. | 351/132 |
| 4,131,341 | 12/1978 | Bradley, Jr. | 351/132 |
| 4,131,401 | 12/1978 | Bradley, Jr. | 423/2 |
| 4,331,393 | 5/1982 | Bradley, Jr. | 351/88 |
| 4,470,674 | 9/1984 | Piampiano | 351/128 |
| 4,792,222 | 12/1988 | Labenz et al. | 351/136 |
| 4,822,159 | 4/1989 | Gaiser | 351/124 |

FOREIGN PATENT DOCUMENTS

0428043A2  6/1990  European Pat. Off. .
WO90/06532  6/1990  PCT Int'l Appl. .

Primary Examiner—Bruce Y. Arnold
Assistant Examiner—Hung Xuan Dang
Attorney, Agent, or Firm—Ross, Howison, Clapp & Korn

[57] ABSTRACT

An ophthalmic device for use with an ophthalmic eyeglass frame includes a detachable nosepiece designed to permit vertical and angular adjustment to fit the bridge of a user's nose and to permit the adjustment of the level of the eyeglass lens in relationship to the plane of the user's eye and includes first and second mounting tabs disposed on the eyeglass frame. A generally U-shaped nosepiece includes first and second legs terminating in first and second ends, respectively. The first leg includes a plurality of spaced apart apertures. The second leg includes a plurality of spaced apart apertures, each aperture being aligned with one of the plurality of spaced apart apertures located on the first leg. The nosepiece is disposed between the first and second mounting tabs, such that the first leg is disposed adjacent to the second mounting tab. Structure is disposed on the mounting tabs for selectively and frictionally engaging the apertures on the legs to retain the nosepiece on the eyeglass frame and to permit angular rotation and vertical positioning of the nosepiece with respect to the eyeglass frame.

8 Claims, 3 Drawing Sheets

OPHTHALMIC DEVICE INCLUDES A DETACHABLE NOSEPIECE

TECHNICAL FIELD OF THE INVENTION

This invention relates to ophthalmic eyeglass frames, and more particularly to an improved detachable nosepiece, frame, and nose pads that provide for multiple adjustments needed to best conform to the bridge of the nose of a user.

BACKGROUND OF THE INVENTION

The usual procedure for the selection and fitting of eyeglasses by an optometrist generally involves a two-step process. In the first step, the user's eyes are checked by the optometrist or the like to ascertain the precise degree of correction required in the lens of the eyeglasses. After this correction is determined, the patient is usually sent to a separate fitting room where a large selection of styles and colors of eyeglass frames are shown to the patient. After a long series of trial and error fitting of the various styles and colors of eyeglass frames to the face and particularly the nose bridge, the final selection is made by the patient. The particular glasses are then custom-made by the optometrist by grinding the prescription formula for the lens and inserting the proper lens into the selected frame.

Such fitting techniques, while many times successful, are not necessarily always successful since standard frames heretofore known generally comprise one of two types which are not necessarily satisfactory for all users. Such frames generally utilize molded nosepieces made of plastic and have relatively small wedge-like contact areas, with the nosepiece being fixed to the eyeglass frames so that no adjustment is possible to take into account the different sizes and shapes of noses. The other type of common nosepiece in use with frames generally sold today consists of a type of floating nosepiece which may be formed of a metal face or sometimes a plastic face with the faces being self-adjusting and used to wedge the nosepiece into the bridge of the nose of the user.

It should be recognized that these types of nosepiece mounts are often considered uncomfortable and can cause severe pressure indentation of the skin of the nose which can be unsightly and irritating after prolonged use in one position of poorly fitting eyeglasses. An ill-fitting pair of eyeglasses such as this, often causes a second problem to the user which is the problem of slippage of eyeglasses on the user's nose. Such slippage occurs because of the poor frictional fit on the nose of the user and the improper distribution of the weight-/load of the eyeglasses.

One ophthalmic device which addresses the above-identified problems is described in U.S. Pat. No. 4,131,341 which provides for a vertical and angular adjusting nosepiece to fit the bridge of a user's nose when used with an eyeglass frame. While the invention of U.S. Pat. No. 4,131,341 provides for an easily adjustable vertically and pivotally nosepiece resulting in a comfortable fit which reduces pressures on the nose bridge of the user, a comfortable balanced fit of an eyeglass frame, an aesthetically acceptable configuration, and a manufacturing industry acceptable design, in some instances, may be still lacking. The nosepiece may not perfectly conform to the user's nose bridge which may result in nonuniform pressures and slippage of the eyeglass frame on the nose of the user. Further, this device does not provide for multiple adjustments most desired and the aesthetically pleasing appearance most acceptable.

A need has thus arisen for an improved ophthalmic device configuration that provides a more satisfying fit of eyeglass frames to the nose bridge of a user.

SUMMARY OF THE INVENTION

In accordance with the present invention, an ophthalmic device for use with an ophthalmic eyeglass frame is provided. The device includes a detachable nosepiece designed to permit vertical and angular adjustment to fit the bridge of a user's nose and to permit the adjustment of the level of the eyeglass lens in relationship to the plane of the user's eye. The device includes first and second mounting tabs disposed on the eyeglass frame. A generally U-shaped nosepiece includes first and second legs terminating in first and second ends, respectively. The first leg includes a plurality of spaced apart apertures. The second leg includes a plurality of spaced apart apertures, each aperture being aligned with one of the plurality of spaced apart apertures located on the first leg. The nosepiece is disposed between the first and second mounting tabs, such that the first leg is disposed adjacent to the first mounting tab, and the second leg is disposed adjacent to the second mounting tab. Structure is disposed on the mounting tabs for selectively and frictionally engaging the apertures on the legs to retain the nosepiece on the eyeglass frame and to permit angular rotation and vertical positioning of the nosepiece with respect to the eyeglass frame.

BRIEF DESCRIPTION OF THE DRAWINGS

For a more complete understanding of the present invention and for further advantages thereof, reference is now made to the following Description of the Preferred Embodiments taken in conjunction with the accompanying Drawings in which.

DESCRIPTION OF THE PREFERRED EMBODIMENTS

Figure 1:
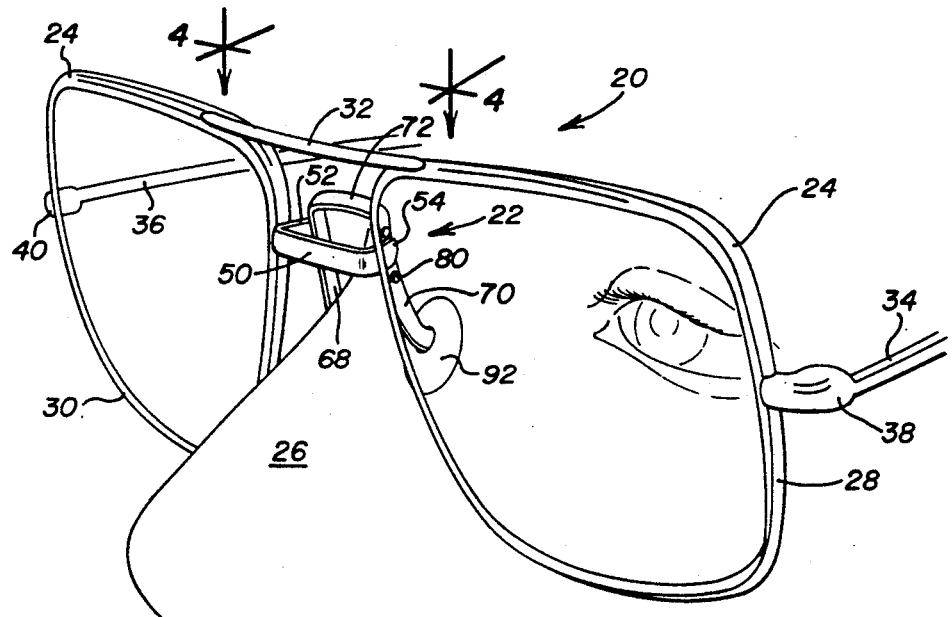
FIG. 1 is a perspective view of the present ophthalmic device illustrating the nosepiece in the center vertical position.

Referring simultaneously to FIGS. 1 through 5, the present ophthalmic device is illustrated, and is generally identified by the numeral 20. Ophthalmic device 20 includes a selectively detachable nosepiece, generally identified by the numeral 22 which is mountable to an eyeglass frame 24. Nosepiece 22 is moveable between selected vertical positions and is also angularly adjustable to fit the bridge of a user's nose 26. Eyeglass frame 24 includes a pair of lens mounts 28 and 30. A bridge 32 interconnects lens mounts 28 and 30 and is rigidly attached thereto. On each side of lens mounts 28 and 30 are temples 34 and 36, respectively. Temples 34 and 36 are hingedly mounted to lens mounts 28 and 30 utilizing hinges 38 and 40.

Nosepiece 22 is detachably mounted to a bracket 50 which is interconnected to lens mounts 28 and 30 below bridge 32. As more clearly shown in FIGS. 4 and 5, bracket 50 includes mounting tabs 52 and 54. Disposed on mounting tabs 52 and 54 is a boss or projection 60. Projection 60 includes multiple facets 62.

Figure 2:
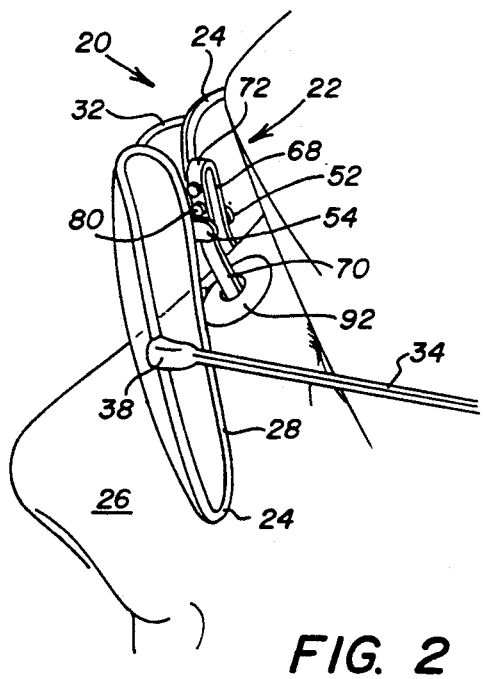
FIG. 2 is a perspective view of the present ophthalmic device shown in FIG. 1 illustrating the nosepiece in the lower vertical position.
Figure 3:
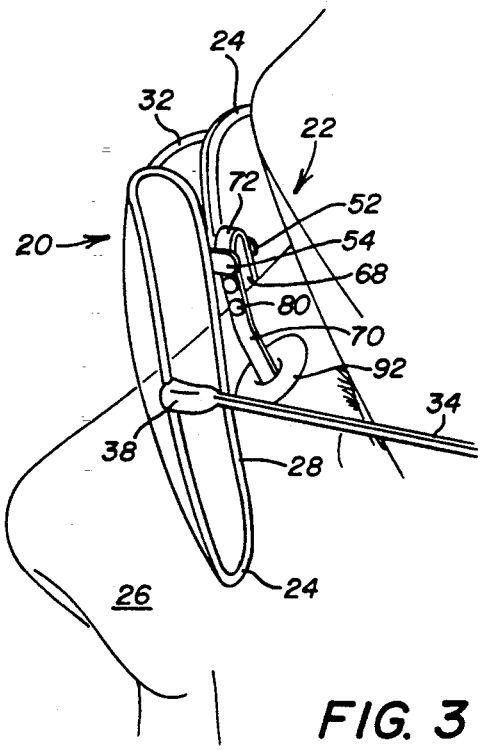
FIG. 3 is a perspective view of the ophthalmic device shown in FIG. 1 illustrating the nosepiece in the upper vertical position.
Figure 4:
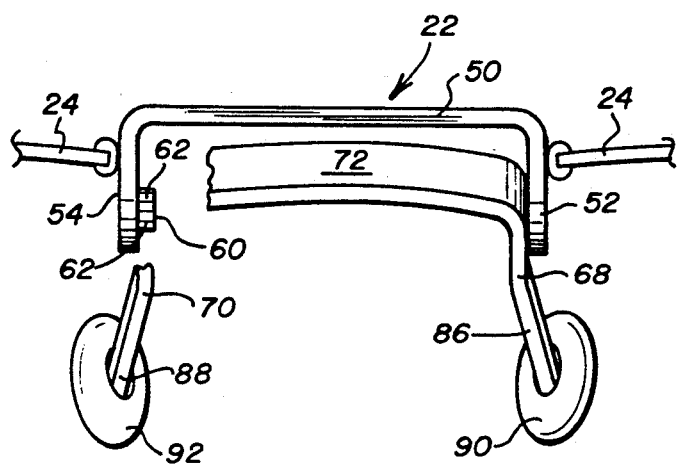
FIG. 4 is a sectional view, partially broken away, taken generally along sectional lines 4—4 of FIG. 1.

Nosepiece 22 includes a U-shaped structure having legs 68 and 70. Legs 68 and 70 are interconnected by a member 72 which is disposed below bridge 32 of frame 24. As illustrated in FIGS. 1-3, legs 68 and 70 include apertures 80. Apertures 80 are configured similarly to multifacets 62 of projection 60, such that apertures 80 receive projection 60 of bracket 50. Through the interconnection between projection 60 and aperture 80, nosepiece 22 is mounted to bracket 50. By adjusting the particular aperture 80 utilized, nosepiece 22 is vertically adjusted with respect to frame 24. For example, in FIG. 1, the center aperture 80 of legs 68 and 70 are utilized to mount nosepiece 22 to bracket 50. FIG. 2 illustrates the lower aperture 80 utilized, and FIG. 3 illustrates the upper aperture 80 utilized for mounting nosepiece 22 to bracket 50. The interconnection between projection 60 and aperture 80 constitutes a frictional interconnection to allow nosepiece 20 to be selectively removed and/or positioned with respect to bracket 50.

Legs 68 and 70 include ends 86 and 88 which engage nose pads 90 and 92 which contact nose 26 of the user. Nose pads 90 and 92 may comprise, for example, soft silicon-like material or may contain fluid that permits nose pads 90 and 92 to conform to the shape of nose 26 in the area where pads 90 and 92 contact nose 26.

Figure 6:
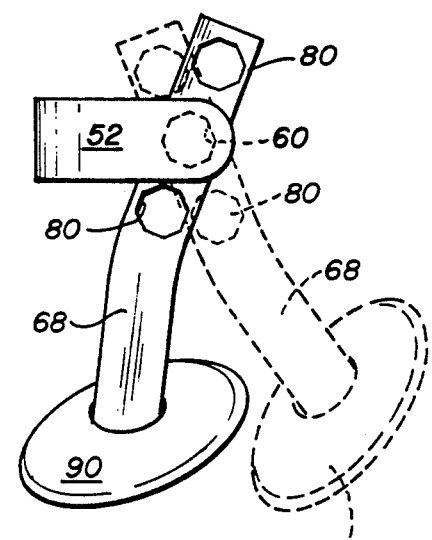
FIG. 6 illustrates the rotational movement of the present nosepiece with respect to the eyeglass frame.
Figure 5:
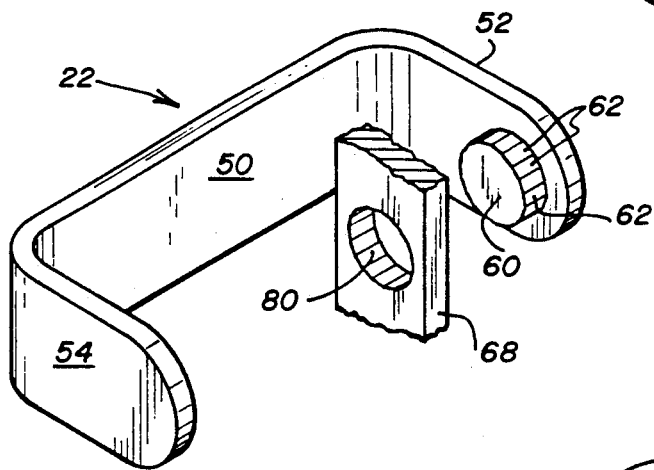
FIG. 5 is an exploded perspective view of the mounting tab and nosepiece interconnection shown in FIG. 4.

Referring now to FIG. 6, nosepiece 22 is rotatable with respect to bracket 50 due to the interconnection between projection 60 and aperture 80. Multifacets 62 engagement with aperture 80 allows nosepiece 22 to be rotated and fixed in a desired position. The alignment of aperture 80 with respect to facets 62 of projection 60 determines the rotational position of nosepiece 22 with respect to bracket 50. It therefore can be seen that through apertures 80, nosepiece 22 is both vertically and rotationally adjustable with respect to bracket 50.

Figure 7:
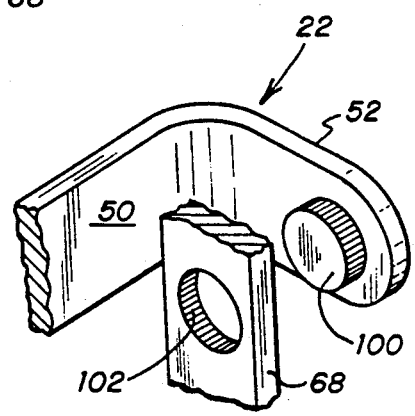
FIG. 7 is an exploded perspective view of an alternate embodiment of the interconnection between the present nosepiece and mounting tab shown in FIG. 4.

Referring to FIG. 7, an additional embodiment of the interconnection between bracket 50 and nosepiece 22 is illustrated. Tab 52 includes a splined projection 100 which mates with an aperture 102 of nosepiece 22. Projection 100 and aperture 102 function in a manner similar to projection 60 and aperture 80 (FIG. 5) to provide vertical adjustment for nosepiece 22 with respect to bracket 50. Tab 54 and leg 70 are similarly configured.

Figure 8:
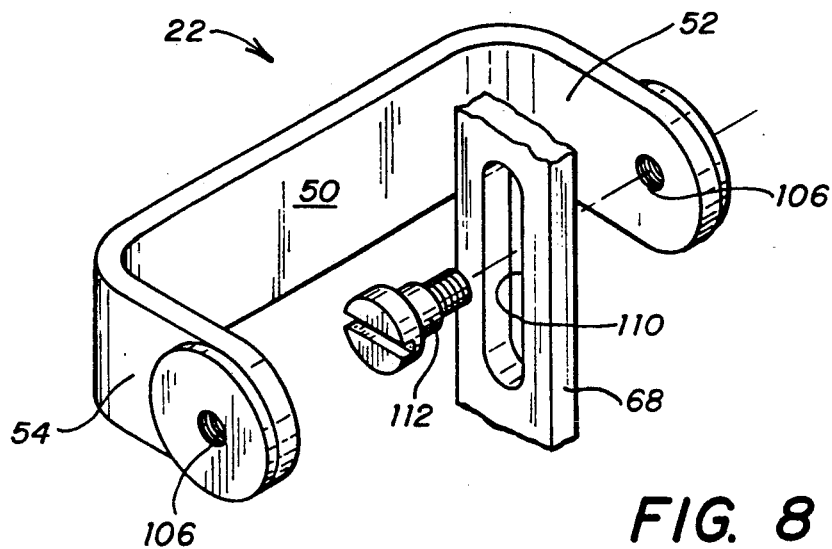
FIG. 8 is an exploded perspective view of an alternate embodiment of the present nosepiece and mounting tab.

Referring to FIG. 8, a further embodiment of the interconnection between nosepiece 22 and bracket 50 is illustrated. Bracket 50 includes threaded apertures 106 within tabs 52 and 54. Legs 68 and 70 of nosepiece 22 include a slotted aperture 110. A fastening device such as, for example, a screw 112 is received through slotted aperture 110 to engage aperture 106 to thereby mount nosepiece 22 to bracket 50. Through the use of slotted aperture 110 of nosepiece 22, vertical adjustment as well as rotational positioning of nosepiece 22 is accomplished. By moving nosepiece 22 vertically with respect to aperture 106 and securing screw 112, the vertical position of nosepiece 22 is selected within the range of slotted aperture 110. Further, the rotational movement of legs 68 and 70 with respect to bracket 50 and permitted by slotted aperture 110, accomplishes rotational adjustment of nosepiece 22 in a manner similarly shown in FIG. 6. Nosepiece 22 is selectively mountable to frame 24 utilizing screw 112.

Figure 9:
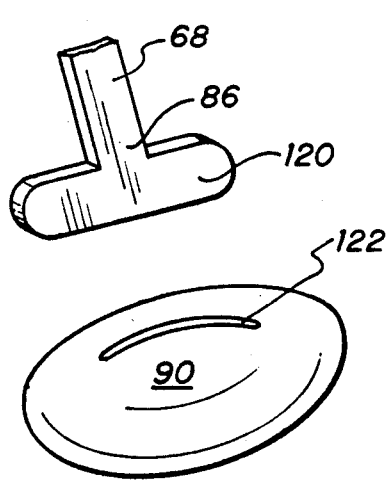
FIG. 9 illustrates an embodiment of the lower leg of the present nosepiece and pad.
Figure 10:
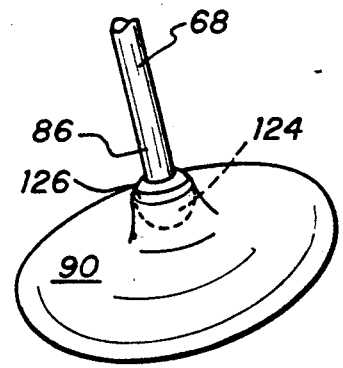
FIG. 10 illustrates an alternate embodiment of the lower leg of the present nosepiece and pad.

FIGS. 9 and 10 illustrate the interconnection between legs 68 and 70 of nosepiece 22 and pads 90 and 92, respectively. Since both leg-nose pad interconnection is similar, FIGS. 9 and 10 only illustrate the interconnection between leg 68 and pad 90.

Referring now to FIG. 9, disposed at end 86 of leg 68, is a perpendicularly disposed foot member 120. Member 120 engages a slot 122 disposed within nose pad 90.

FIG. 10 illustrates end 86 of leg 68 terminating in a sphere 124 which is received by a socket 126 within nose pad 90. Both the configurations illustrated FIGS. 9 and 10, allow nose pads 90 and 92 to be selectively removable and replaced to allow the user to select various sizes and shapes of nose pads 90 and 92 to be utilized with nosepiece 22. The interconnection between legs 68 and 70 and nose pads 90 and 92 allow nose pads 90 and 92 to rotate to conform to the shape of nose 26.

It therefore can be seen that the present invention provides for an improved detachable nosepiece, mounting frame, and nose pads for use with an ophthalmic eyeglass frame. The nosepiece and frame are designed to permit numerous vertical and angular adjustments, to fit the bridge of a user's nose, and to permit the adjustment of the level of the eyeglass lens to the plane of the user's eyes. The present invention makes possible periodic adjustments to and changes of nose pads and the height of the nosepiece to minimize eyeglass frame slippage. The present invention also makes possible the shifting, as desired, of the pressure of the nose pads to other locations on the nose bridge of the user, thus reducing discomfort to the wearer of eyeglass frames.

Whereas the present invention has been described with respect to specific embodiments thereof, it will be understood that various changes and modifications will be suggested to one skilled in the art and it is intended to encompass such changes and modifications as fall within the scope of the appended claims.

I claim:

1. An ophthalmic device for use with an ophthalmic eyeglass frame having a detachable nosepiece designed to permit vertical and angular adjustment to fit the bridge of a user's nose and to permit the adjustment of the level of the eyeglass lens in relationship of the plane of the user's eye, the device comprising:
   first and second mounting tabs disposed on the eyeglass frame;
   a generally U-shaped nosepiece having first and second legs terminating in first and second ends, respectively;
   said first leg including a plurality of spaced apart apertures, said second leg including a plurality of spaced apart apertures, each aperture being aligned with one of said plurality of spaced apart apertures of said first leg;

said nosepiece disposed between said first and second mounting tabs, such that said first leg is disposed adjacent to said first mounting tab and said second leg is disposed adjacent to said second mounting tab;

means disposed on said mounting tabs for selectively and frictionally engaging said apertures on said legs to thereby retain said nosepiece on the eyeglass frame and to permit angular rotation and vertical positioning of said nosepiece with respect to the eyeglass frame; and first and second pads disposed on said first and second ends of said first and second legs, respectively, of said nosepiece for contacting the user's nose.

2. The ophthalmic device of claim 1 wherein said means disposed on said mounting tabs includes a multifaceted projection, and said first and second legs include means for receiving said projection.

3. The ophthalmic device of claim 1 wherein said means disposed on said mounting tabs includes a splined shaft, and said first and second legs include means for receiving said shaft.

4. The ophthalmic device of claim 1 wherein said ends of said legs each include an elongated member, disposed generally perpendicularly to said leg, and said pads include an elongated slot for receiving said elongated members for allowing said pads to rotate on said legs.

5. The ophthalmic device of claim 1 wherein said ends of said legs each include a generally spherical member, and said pads include an aperture for receiving said spherical member for allowing said pads to rotate on said legs.

6. An ophthalmic device for use with an ophthalmic eyeglass frame having a detachable nosepiece designed to permit vertical and angular adjustment to fit the bridge of a user's nose and to permit the adjustment of the level of the eyeglass lens in relationship of the plane of the user's eye, the device comprising:

first and second mounting tabs disposed on the eyeglass frame;

a generally U-shaped nosepiece having first and second legs terminating in first and second ends, respectively;

said first leg including an elongated aperture, said second leg including an elongated aperture and being aligned with said aperture of said first leg;

said nosepiece disposed between said first and second mounting tabs, such that said first leg is disposed adjacent to said first mounting tab and said second leg is disposed adjacent to said second mounting tab;

fastener means for selectively interconnecting said legs to said tabs and being disposed through said elongated apertures to thereby retain said nosepiece on the eyeglass frame and to permit angular rotation and vertical positioning of said nosepiece with respect to the eyeglass frame; and first and second pads disposed on said first and second ends of said first and second legs, respectively, of said nosepiece for contacting the user's nose.

7. The ophthalmic device of claim 6 wherein said ends of said legs each include an elongated member, disposed generally perpendicularly to said leg, and said pads include an elongated slot for receiving said elongated members for allowing said pads to rotate on said legs.

8. The ophthalmic device of claim 6 wherein said ends of said legs each include a generally spherical member, and said pads include an aperture for receiving said spherical member for allowing said pads to rotate on said legs.

* * * * *